US006776759B2

(12) United States Patent
Heimdal et al.

(10) Patent No.: US 6,776,759 B2
(45) Date of Patent: Aug. 17, 2004

(54) METHOD AND APPARATUS FOR HIGH STRAIN RATE REJECTION FILTERING

(75) Inventors: Andreas Heimdal, Oslo (NO); Hans Garmann Torp, Trondheim (NO)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 116 days.

(21) Appl. No.: 09/683,889

(22) Filed: Feb. 27, 2002

(65) Prior Publication Data

US 2003/0163043 A1 Aug. 28, 2003

(51) Int. Cl.[7] ............................................. A61B 8/06
(52) U.S. Cl. ..................................... 600/442; 600/453
(58) Field of Search .............................. 600/407, 437, 600/438, 439, 440, 441–449, 450, 451–459; 73/625, 626; 128/916; 367/7, 11, 130, 138

(56) References Cited

U.S. PATENT DOCUMENTS

| | | | | |
|---|---|---|---|---|
| 6,053,869 A | * | 4/2000 | Kawagishi et al. | 600/443 |
| 6,099,471 A | | 8/2000 | Torp et al. | |
| 6,352,507 B1 | | 3/2002 | Torp et al. | |
| 6,447,450 B1 | * | 9/2002 | Olstad | 600/437 |
| 6,508,768 B1 | * | 1/2003 | Hall et al. | 600/443 |
| 2002/0072674 A1 | * | 6/2002 | Criton et al. | 600/454 |
| 2003/0013957 A1 | * | 1/2003 | Bjaerum et al. | 600/437 |
| 2003/0013962 A1 | * | 1/2003 | Bjaerum et al. | 600/443 |
| 2003/0013963 A1 | * | 1/2003 | Bjaerum et al. | 600/443 |
| 2003/0013964 A1 | * | 1/2003 | Bjaerum et al. | 600/443 |

OTHER PUBLICATIONS

Cain et al., "Assessment of Regional Long–Axis Function During Dobutamine Echocardiography", Clinical Science, vol. 100, No. 4, p. 423–432, 2001.

Kowalski et al., "Can Natural Strain and Strain Rate Quantify Regional Myocardial Deformation? A Study in Healthy Subjects", Ultrasound Med. Biol., vol. 27, No. 8, p. 1087–97, 2001.

Slordahl et al., "High Frame Rate Strain Rate Imaging of The Interventricular Septum in Healthy Subjects", European Journal of Ultrasound, vol. 14, Issues 2–3, p. 149–155, 2001.

Stoylen et al., "Strain Rate Imaging in Normal and Reduced Diastolic Function: Comparison With Pulsed Doppler Tissue Imaging of the Mitral Annulus", Journal of the American Society of Echocardiography, vol. 14, No. 4, p. 264–274, 2001.

Voigt et al., "Assessment of Regional Longitudinal Myocardial Strain Rate Derived from Doppler Myocardial Imaging Indices in Normal and Infracted Myocardium", Journal of the American Society of Echocardiography, vol. 13, No. 6, pp. 588–598, 2000.

* cited by examiner

Primary Examiner—Ali Imam
(74) Attorney, Agent, or Firm—McAndrews, Held & Malloy, Ltd.; Peter J. Vogel; Michael A. Dellapenna

(57) ABSTRACT

A method and apparatus is provided for generating and displaying filtered strain rate signals corresponding to tissue structure within a subject in response to complex Doppler signals generated by an ultrasound system. Various combinations of several processing techniques are employed including filtering out high strain rate signals due to reverberation and other sources of noise, complex autocorrelation, velocity signal estimation, real strain rate signal estimation, complex strain correlation signal estimation, complex signal averaging, and real signal averaging. Color strain rate imaging is provided using the techniques such that the color images have reduced noise and improved image quality.

58 Claims, 4 Drawing Sheets

METHOD AND APPARATUS FOR HIGH STRAIN RATE REJECTION FILTERING

BACKGROUND OF INVENTION

Certain embodiments of the present invention relate to a diagnostic ultrasound system which measures and images anatomical structures and their movements. More particularly, certain embodiments relate to methods and apparatus for generating and displaying strain rate signals associated with moving tissue structure by reducing noise due to reverberations and other sources in the strain rate signals.

Within the field of ultrasound imaging, physicians have become interested in using tissue strain and strain rate for clinical measurements. The term "strain" refers to a characteristic of the tissue being examined. For example, the strain associated with muscle tissue corresponds to a ratio of the muscle tissue's initial length and the change in muscle tissue length during a prescribed time interval. In ultrasound imaging, the rate of change of strain (i.e. strain rate) is typically visually presented to a physician as a colorized 2-dimensional image, where variations in color correspond to different strain rates. It has become apparent that the viability of a segment of the cardiac muscle is related to the amount of muscle strain and temporal behavior of the strain that is performed by, or imposed on the muscle segment. Also, it has been determined that malignant tumors may be detected based on the resistance to compression.

One application of real-time strain rate imaging is in cardiology. The strain rate gives a direct and quantitative measure for the ability of the myocardium to contract and relax. By imaging along the myocardium from an apical view, the local strain rate component along the long axis of the heart may be measured. Measuring the local strain rate component gives information about the local shortening and lengthening of the heart wall. By imaging from the parasternal view, the strain rate component perpendicular to the heart wall gives information about the local thickening of the muscle. Wall thickening measured with M-mode or from the 2D image is a commonly used measure for muscle viability. With strain rate imaging, a direct measure for the thickening is available. The strain rate images may potentially add to the diagnosis of a number of cardiac disorders.

To understand strain rate in more detail, it is assumed that a segment of tissue of initial length $L_o$ may be stretched or compressed or itself lengthens or contracts to a different length L. The one-dimensional strain, defined as $$\varepsilon = \frac{L - L_o}{L_o} \quad (1)$$

represents a dimensionless description of the change. If the length L is considered to be a function of time, L(t), the temporal derivative of the strain, the strain rate, may be found using the equation $$\dot{\varepsilon} = \frac{\delta \varepsilon}{\delta t} \quad (2)$$

If the velocity, v of every point in the object is known, an equivalent definition of the strain rate is $$\dot{\varepsilon} = \frac{\delta v}{\delta r} \quad (3)$$

The equations also provide a useful description of the deformation of the tissue segment. The strain rate measures the rate of the deformation of the segment. If the strain rate is zero, the shape of the segment is not changing. If the strain rate is positive, the length of the segment is increasing, and if the strain rate is negative, the length of the segment is decreasing.

Strain rates that occur above a given level are assumed to be non-physiological and, therefore, are artifacts caused by reverberations or other noise sources during imaging. Reverberations are caused by multiple reflections within the tissue. The reverberations and noise may bias the velocity gradient estimated within the tissue due to correlation with a false or corrupted echo. Falsely increased, decreased or even reversed strain rate estimates may result. There is a certain range of physiological strain rates in both normal and diseased tissue. In the normal and diseased human cardiac muscle, for instance, the peak positive and peak negative longitudinal strain rates have been reported as +3.14 $s^{-1}$ and −1.78 $s^{-1}$ respectively. The values include artificially increased contraction by stress echocardiography.

One possible explanation for the increased strain rate caused by stationary reverberations is described. Assuming a constant spatial velocity gradient, the velocity samples along a beam line are increasing along the beam. The strain rate may be estimated as the difference between pairs of velocity samples divided by the distance between them, and, in this case, yields a spatially constant strain rate.

Furthermore, assuming a region influenced by a reverberation, there may be a bias $b_{rev}$ in the velocity estimate. The effect on the strain rate is a reverberation bias, $b_{rev}/(2d_s)$, above and below the reverberation region where $d_s$ is the distance between two points of the tissue segment. Depending on the amount of the velocity bias due to the reverberation, the estimated strain rate may achieve values outside the normal range.

Previous efforts to solve the problem of noise in the strain rate estimation have used a clutter filter on the tissue velocity data prior to calculation of the strain rate. There are various problems with the method. First, the clutter filter may introduce its own velocity estimation bias, which again is reflected as a strain rate estimation bias. Second, when the velocity is near zero (as in the diastolic diastasis period of the cardiac cycle), the clutter filter tends to increase the variance of the velocity estimates, and thus also the variance of the strain rate estimates.

U.S. Pat. No. 6,099,471 to Torp et al. is directed to a method and apparatus for real-time calculation and display of strain in ultrasound imaging. Ser. No. 09/432,061 (now issued U.S. Pat. No. 6,352,507 B1) to Torp et al. is directed to a method and apparatus for providing real-time calculation and display of tissue deformation in ultrasound imaging.

A need exists for an approach to filtering out non-physiological high strain rates in strain rate imaging due to reverberation and other sources of noise.

SUMMARY OF THE INVENTION

An embodiment of the present invention provides an ultrasound system for generating and displaying filtered strain rate signals corresponding to structure within a subject in response to complex Doppler signals. Various combinations of several processing techniques are employed including filtering out high strain rate signals due to reverberation and other sources of noise, complex autocorrelation, velocity signal estimation, real strain rate signal estimation, complex strain correlation signal estimation, complex signal averaging, and real signal averaging.

Apparatus is provided for generating, filtering, and displaying strain rate signals from signals sampled by the ultrasound system. "Filtering", as used throughout, means extracting or modifying those signals that are corrupted due to reverberation or noise. The apparatus includes a Doppler processing module and a strain rate. processing module for performing various combinations of several functions that include complex autocorrelation, velocity signal estimation, real strain rate signal estimation, complex strain correlation signal estimation, complex signal averaging, and real signal averaging.

A method is also provided for generating, filtering, and displaying strain rate signals from signals sampled by the ultrasound system. The method includes filtering out high strain rate signals due to reverberation and other sources of noise, performing various combinations of several functions that include complex autocorrelation, velocity signal estimation, real strain rate signal estimation, complex strain correlation signal estimation, complex signal averaging, and real signal averaging.

Certain embodiments of the present invention afford an approach to generating and displaying filtered, color strain rate images having reduced noise and improved image quality.

DETAILED DESCRIPTION

Figure 1:
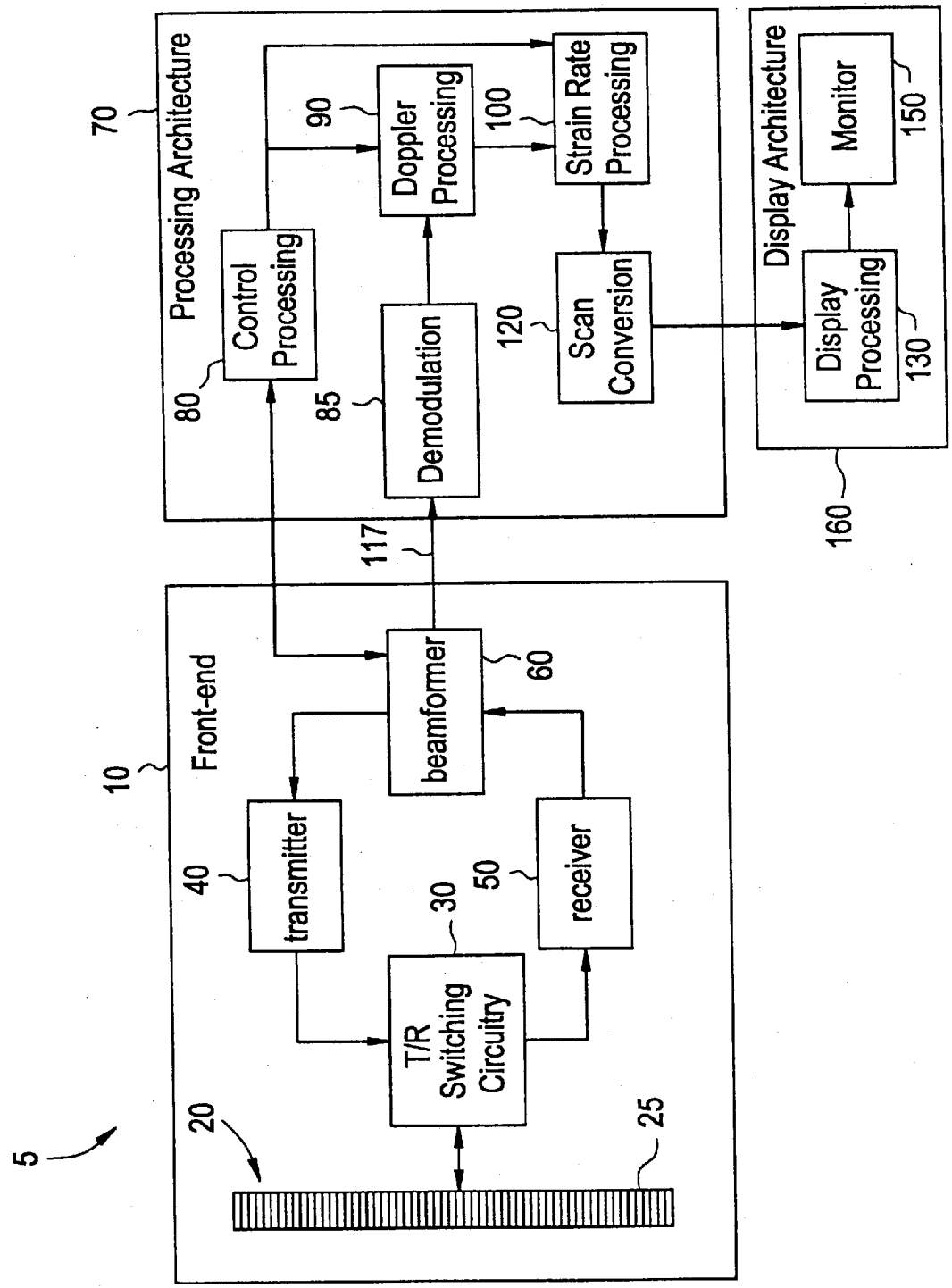
FIG. 1 is a schematic block diagram of an ultrasound system illustrating strain rate processing in relation to other elements of the system in accordance with one embodiment of the present invention.

FIG. 1 is a schematic block diagram of the ultrasound system 5 showing the architecture used to create strain rate color images in accordance with one embodiment of the present invention. The illustrated elements of the ultrasound system are the front-end 10, the processing architecture 70, and the display architecture 160. Front-end 10 comprises a transducer array 20 (comprising a plurality of transducer elements 25), transmit/receive switching circuitry 30, a transmitter 40, a receiver 50, and a beamformer 60. Processing architecture 70 comprises a control processing module 80, a demodulation module 85, a Doppler processing module 90, a strain rate processing module 100, and a scan conversion module 120. Display architecture 160 comprises display processing module 130 and a monitor 150.

In the front-end 10, the transducer array 20 is connected to the transmit/receive (T/R) switching circuitry 30. The T/R switching circuitry 30 is connected to the output of transmitter 40 and the input of receiver 50. The output of receiver 50 is connected to beamformer 60. Beamformer 60 is further connected to the input of transmitter 40, an input of control processing module 80, and the input of demodulation module 85 in processing architecture 70.

In processing architecture 70, control processing module 80 is connected to Doppler processing module 90 and strain rate processing module 100. The output of demodulation module 85 is connected to the input of Doppler processing module 90. The output of Doppler processing module 90 is connected to an input of strain rate processing module 100. The output of strain rate processing module 100 is connected to the input of scan conversion module 120. The output of scan conversion module 120 is connected to the input of display processing module 130 in display architecture 160. In display architecture 160, the output of display processing module 130 is connected to monitor 150.

When a frame of data is to be sampled from a subject, the transducer array 20 is used to transmit ultrasound waves into the subject. The transducer array 20 may be a linear array or a curved array of many individual transducer elements 25. Each transducer element 25 is capable of generating ultrasound waves in response to a signal from the transmitter 40. In addition, the phase relationship of the ultrasound waves between transducer elements may be controlled. The result is an ultrasound beam of energy being transmitted into a subject at a certain angle with respect to an orthogonal direction to the surface of the transducer array 20 and effectively originating from a point on the surface of the transducer array 20. Multiple elements 25 are typically used to transmit an ultrasound beam. The phase relationship between the ultrasound waves transmitted from the multiple elements 25 determines the steering angle of the beam being transmitted. The number of transducer elements 25 used for transmission, as well as other factors such as apodization, determine the shape of an ultrasound beam along its length within a subject.

To generate a transmitted ultrasound beam, the control processing module 80 sends command data to the beamformer 60 which tells the beamformer to generate transmit parameters to create a beam of a certain shape that originates from a certain point at the surface of the transducer array 20 at a certain steering angle within a scan plane 140 (see FIG. 2) along a scan line (e.g. 145). The transmit parameters are sent from the beamformer 60 to the transmitter 40. The transmitter 40 uses the transmit parameters to properly encode transmit signals to be sent to the transducer array 20 through the T/R switching circuitry 30. The transmit signals are of certain levels and phases with respect to each other and are provided to individual transducer elements 25 of the transducer array 20. The transmit signals excite the transducer elements 25 of the transducer array 20 to emit ultrasound waves with the same phase and level relationships as that of the transmit signals. As a result, a transmitted beam of ultrasound energy is formed within the tissue of a subject within a scan plane 140 along a scan line (e.g. 145) when the transducer array 20 is acoustically coupled to the subject by using, for example, ultrasound gel. The process is known as electronic scanning. For Doppler applications, the transmit signals are typically transmitted as packets of multiple pulses at a pulse repetition frequency (PRF). Reflections of the multiple pulses are used to make up complex Doppler data packets on receive.

The transducer array 20 is a two-way transducer. Once ultrasound waves are transmitted into a subject, the waves are backscattered off of sample volumes of tissue within the structure of the subject. The backscattered waves arrive at the transducer array 20 at different times, depending on the distance into the tissue they returned from and the angle with respect to the surface of the transducer array 20 at which they return. The transducer elements 25 of the transducer array 20 are responsive to the backscattered waves and convert the ultrasound energy from the backscattered waves into received electrical signals.

The received electrical signals are routed through the T/R switching circuitry 30 to the receiver 50. The receiver 50 amplifies and digitizes the received signals and provides other functions such as gain compensation. The digitized received signals correspond to the backscattered waves received by each transducer element 25 at various times and preserve the amplitude and phase information of the backscattered waves.

The digitized received signals are sent to beamformer 60. The control processing module 80 sends command data to beamformer 60. Beamformer 60 uses the command data to form a receive beam originating from a point on the surface of the transducer array 20 at a steering angle typically corresponding to the point and steering angle of the previously transmitted ultrasound beam. The beamformer 60 operates on the appropriate received signals by performing time delaying and focusing, according to the instructions of the command data from the control processing module 80, to create received beam signals corresponding to sample volumes along a scan line (e.g. 145) in the tissue structure of the subject. The phase, amplitude, and timing information of the received signals from the various transducer elements 25 are used to create the received beam signals.

The received beam signals are sent to processing architecture 70 over digital interface 117. Demodulation module 85 performs demodulation on the received beam signals to create pairs of I and Q demodulated data values corresponding to sample volumes (e.g. 141 and 142) along the length of a scan line (e.g. 145) corresponding to the received beam. Demodulation is accomplished by comparing the phase and amplitude of the received beam signals to a reference frequency. The I and Q demodulated data values preserve the phase and amplitude information of the received signals. The amplitude information of an I and Q data pair for a given sample volume location is mathematically equivalent to $$\sqrt{I^2+Q^2}$$

The phase information is mathematically equivalent to $$\tan^{-1}\left(\frac{Q}{I}\right).$$

Thus, a single amplitude data value and a single phase data value may be yielded for a single I and Q data pair corresponding to a sample volume location.

The data values are also referred to as complex Doppler data, since any shift in phase due to the Doppler effect is inherent in the data. The I and Q demodulated data values preserve the phase and amplitude information induced by Doppler shifts in the received signals due to moving tissue within a subject being scanned.

Multiple transmitted and received beams are formed to sample a frame of data in a scan plane 140 of a subject being scanned. The demodulated I and Q data corresponding to the received beams is sent to Doppler processing module 90 in the form of Doppler data packets (e.g. 143 and 144) where they are subsequently processed to ultimately create color strain rate images. A complex Doppler data packet comprises multiple I and Q data pairs sampled from a sample volume location at a certain rate known as the PRF. A typical Doppler packet for strain rate imaging may include, for example, 16 complex I and Q data pairs.

Strain rates that occur above a given level are assumed to be non-physiological and, therefore, are artifacts caused by reverberations or other noise sources during imaging. Reverberations are caused by multiple reflections within the tissue. The reverberations and noise may bias the velocity gradient that is estimated within the tissue due to correlation with a false or corrupted echo. The result may be falsely increased, decreased or even reversed strain rate estimates. There is a certain range of physiological strain rates in both normal and diseased tissue. The range may depend on what direction of deformation in the muscle that is measured. In the longiturdinal direction, for instance, the peak positive and peak negative strain rates have been reported as +3.14 $s^{-1}$ and −1.78 $s^{-1}$ respectively in normal and diseased human cardiac muscle. In the radial direction, the peak values have been reported as +3.09 $s^{-1}$ and −8.23 $s^{-1}$. Table 1 provides a detailed list of measurements.

TABLE 1

Reported peak strain rates in the human cardiac muscle.

| Peak strain rate ($s^{-1}$) | Standard deviation ($s^{-1}$) | Direction | Cardiac phase | Walls studied | Heart condition | Stress level | Reference |
|---|---|---|---|---|---|---|---|
| +3.09 | 0.69 | Radial | Sys | Posterior | Normal | | [Kowalski01] |
| −8.23 | 2.66 | Radial | E | Posterior | Normal | | [Kowalski01] |
| +3.14 | 0.50 | Long. | E | Septum | Normal | | [Slørdahl01] |
| +2.22 | 0.49 | Long | E, A | All LV | Normal and hypertension | | [Stoylen01] |
| +2.03 | 0.71 | Long. | E | All LV | Normal | | [Kowalski01] |
| +1.95 | 0.62 | Long. | IVR | Normal segments | Transmural infarct | | [Voigt00] |
| −1.27 | 0.39 | Long. | Sys | All LV | Normal | | [Voigt00] |
| −1.40 | 0.21 | Long. | Sys | All LV | Normal and hypertension | | [Stoylen01] |
| −1.55 | 0.30 | Long. | Sys | All LV | Normal | | [Kowalski01] |
| −1.65 | 0.13 | Long. | Sys | Septum | Normal | | [Slørdahl01] |
| −1.75 | 0.65 | Long. | Sys | All LV | Normal | Peak | [Cain01] |
| −1.78 | 0.67 | Long. | IVR | Infarcted segments | Transmural infarct | | [Voigt00] |

References in Table 1

[Cain01] P. Cain, T. H. Marwick, C. Case, T. Baglin, J. Dart, L. Short, B. Olstad, "Assessment of regional long-axis function during dobutamine echocardiography", Clinical Science, Vol.100, No. 4, p. 423–432, 2001.

[Kowalski01] M. Kowalski, T. Kukulski, F. Jamal, J. D'hooge, F. Weidemann, F. Rademakers, B. Bijnens, L. Hatle, G. R. Sutherland, "Can natural strain and strain rate quantify regional myocardial deformation? A study in healthy subjects", Ultrasound Med Biol., Vol. 27, No. 8, p. 1087–97, 2001.

[SIørdahl01] S. A. SIørdahl, S. Bjærum, B. H. Amundsen, A. Støylen, A. Heimdal, S. I. Rabben, H. Torp, "High frame rate strain rate imaging of the interventricular septum in healthy subjects", European Journal of Ultrasound, Vol.14, Issues 2–3, p 149–155, 2001.

[Stoylen01] A. Stoylen, S. Slordahl, G. K. Skjelvan, A. Heimdal, T. Skjaerpe, "Strain rate imaging in normal and reduced diastolic function: Comparison with pulsed doppler tissue imaging of the mitral annulus", Journal of the American Society of Echocardiography, Vol.14, No. 4, p. 264–274, 2001.

[Voigt00] J. -U. Voigt, M. F. Arnold, M. Karlsson, L. Hubbert, T. Kukulski, L. Hatle, G. R. Sutherland, "Assessment of regional longitudinal myocardial strain rate derived from Doppler myocardial imaging indices in normal and infracted myocardium", Journal of the American Society of Echocardiography, vol 13, no 6, pp 588–598, 2000.

Figure 3:
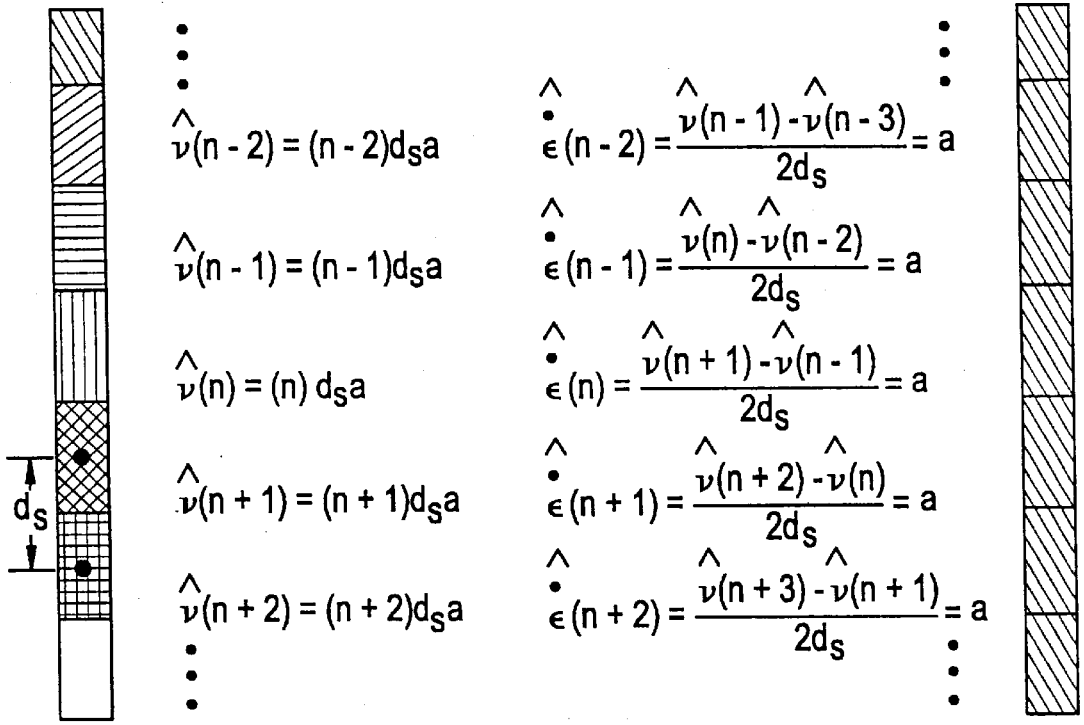
FIG. 3 graphically and mathematically illustrates how reverberation may bias velocity estimates and strain rate estimates in the system of FIG. 1.
Figure 3:
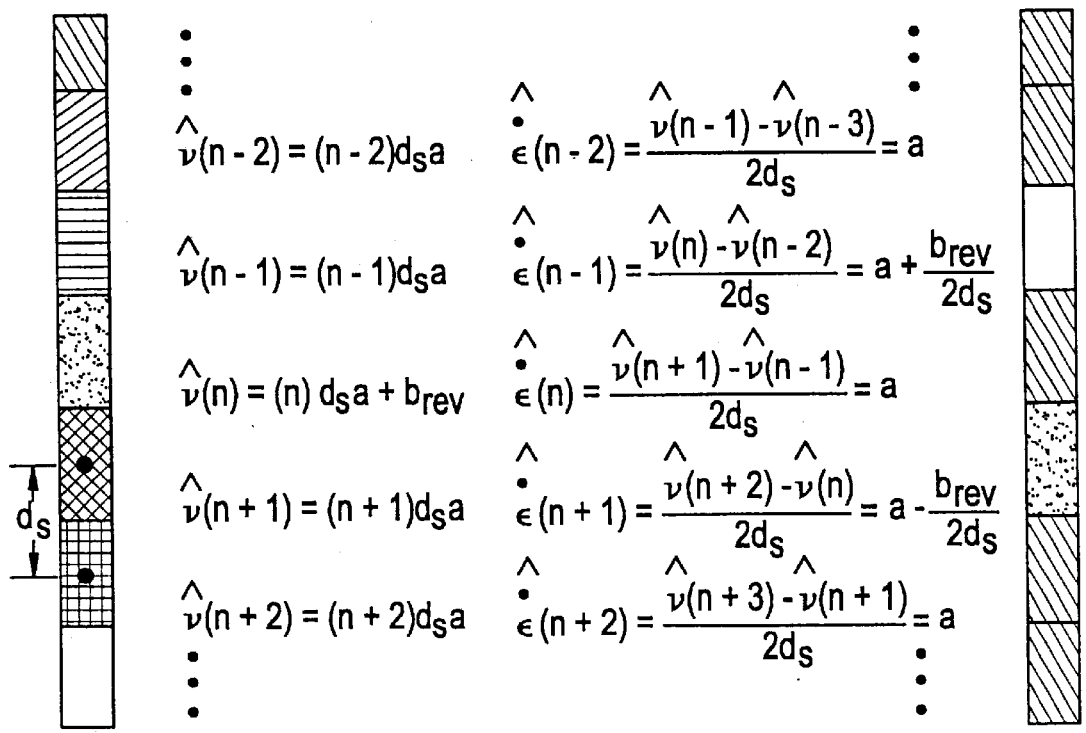

One possible explanation for the increased strain rate caused by stationary reverberations is described. FIG. 3 mathematically illustrates how reverberation may bias velocity estimates and strain rate estimates. Referring to FIG. 3, assuming a constant spatial velocity gradient, the velocity samples, $$\hat{v}$$

along a beam line are increasing along the beam. The strain rate may be estimated as the difference between pairs of velocity samples divided by the distance between them, $2d_s$, and, in this case, yields a spatially constant strain rate, $$\overset{+}{\varepsilon} = a.$$

Furthermore, assuming a sample volume n influenced by a reverberation, there may be a bias $b_{rev}$ in the velocity estimate $$\hat{v}(n).$$

The effect on the strain rate is a reverberation artifact, $b_{rev}/2d_s$, above and below the reverberation sample volume location at sample volume locations n−1 and n+1 that are adjacent to sample volume location n. Depending on the amount of the velocity bias due to the reverberation, the estimated strain rates $$\overset{+}{\varepsilon}(n-1) \text{ and } \overset{+}{\varepsilon}(n+1)$$

may achieve values outside the normal range and give false indications of the true strain rate of the tissue at the locations.

Figure 4:
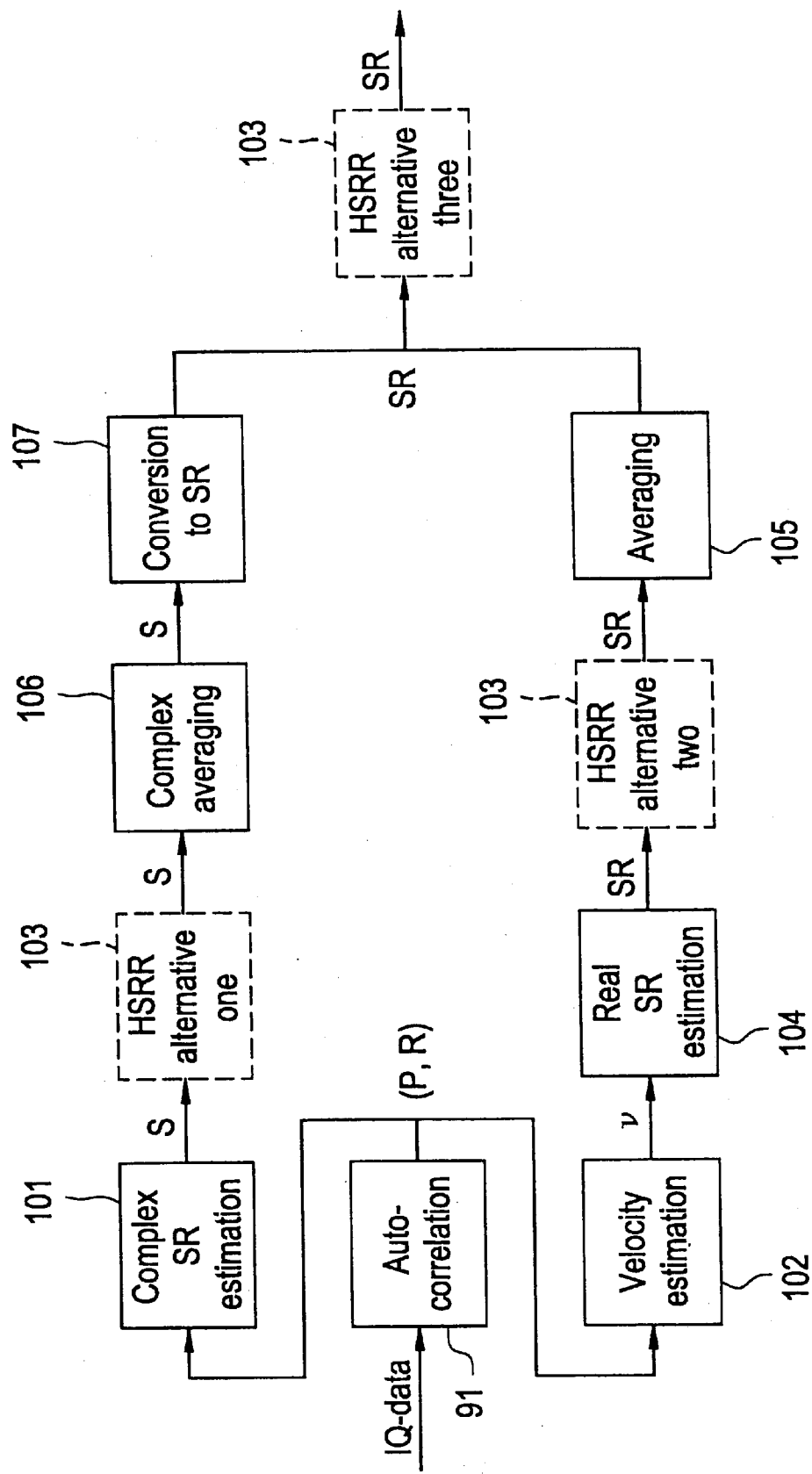
FIG. 4 illustrates several possible embodiments for performing high strain rate rejection filtering.

The high strain rate values may be filtered out before displaying a color strain rate image to an operator such that reverberation and noise artifacts may be minimized, if not totally eliminated. High strain rate rejection (HSRR) filtering is employed in strain rate processing module 100. FIG. 4 illustrates several possible embodiments for performing high strain rate rejection filtering.

The HSRR filtering may be performed at different stages in the strain rate image generation process. All the alternatives are based on processing real-time or previously stored packets of complex Doppler I and Q data (i.e. complex demodulated radio frequency (RF) ultrasound data). The strain rate processing starts in step 91 of the embodiment of FIG. 4 where complex autocorrelation is performed (e.g. using the well known Kasai algorithm) to compute the power, P, and correlation with lag one, R, of the sampled I and Q data. Step 91 is performed in Doppler processing module 90 on the I and Q data packets (e.g. 143 and 144) from demodulation module 85.

If a packet of complex Doppler I and Q signals is represented as x(r,t) 143 where r represents range (depth) and t is the time sampling index, then for a given range r, $$P(r) = \sum_t conj[x(r,t)]x(r,t) \qquad (4)$$

$$R(r) = \sum_t conj[x(r,t)]x(r,t+1) \qquad (5)$$

where conj[ ] means the complex conjugate operation.

The power and complex autocorrelation data, P(r) and R(r), are sent to strain rate processing module 100 for subsequent processing.

Figure 2:
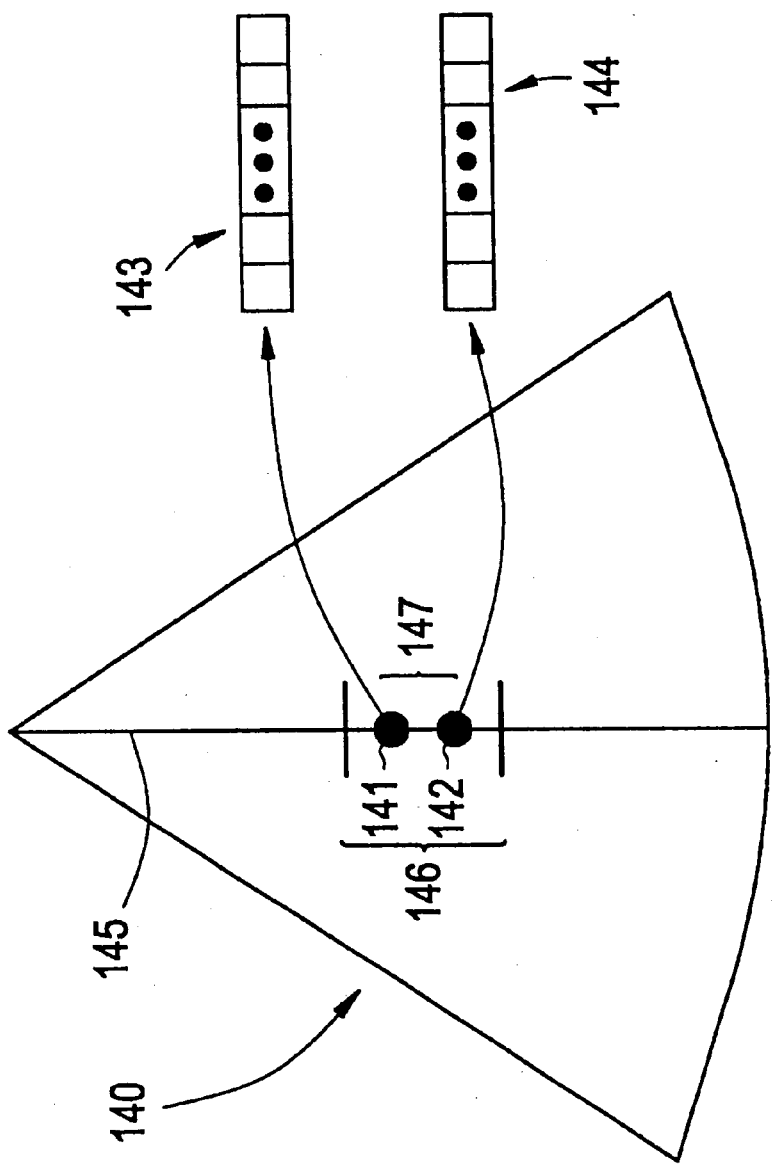
FIG. 2 illustrates a scan plane with two sample volume locations bounding a tissue segment within a sample gate positioned by a user of the system of FIG. 1 in accordance with an embodiment of the present invention.

In a first embodiment of the invention, the complex strain correlation of R(r), termed S(r), is calculated by the strain rate processing module 100 in step 101 of FIG. 4. Referring to FIG. 2, the strain rate may be determined from the phase difference between complex autocorrelation values at two different sample volume locations 141 and 142 in the scan plane 140 separated by a distance dr 147. The complex autocorrelation values R(r) and R(r+dr) are calculated by Doppler processor 90 using equation (5) operating on complex Doppler signal packets x(r,t) 143 and x (r+dr,t) 144. In step 101, strain rate processing module 100 calculates S(r) as $$S(r)=conj[R(r)]*R(r+dr) \qquad (6)$$

where the resulting complex number S(r) has a phase angle equal to the difference between the phase angles of R(r) and R(r+dr). The phase angle of S(r) is proportional to the strain rate for the tissue segment dr 147.

In step 103 (HSRR alternative 1), the HSRR filtering in strain rate processing module 100 sets all S(r) samples with phase angles corresponding to strain rate values greater than pre-determined HSRR limits to complex zero. The samples are considered non-physiological and are due to reverberation or other sources of noise. For example, the limits may be the peak values in Table 1 with one or two times the maximum standard deviation added.

Next, in step 106, complex averaging is performed on the samples S(r) that pass through the HSRR filtering by strain rate processing module 100. The complex averaging may be spatial averaging of neighboring spatial samples, temporal averaging of neighboring time samples, or a combination of both spatial and temporal complex averaging. The averaging is done to fill in gaps and smooth out the image, making the image appear less noisy, using well-known averaging techniques.

The averaged, complex strain correlation S(r) samples are then converted to filtered strain rate samples SR(r) in step 107 by strain rate processing module 100. The strain rate conversion 107 uses the following equation to calculate the strain rate SR(r) from the strain correlation S(r) as $$SR(r)=[c/(4\pi dr T f_o)]*\text{phase}[S(r)] \quad (7)$$

where c is the speed of sound in the tissue, T is the time between consecutive [I,Q] sample pairs in a Doppler data packet (typically T=1/PRF where PRF is the pulse repetition frequency), dr 147 is the distance between two sample volume locations 141 and 142 in the scan plane 140, and $f_o$ is the ultrasound frequency of transmission.

The filtered strain rate values SR(r) are then passed to scan conversion module 120 to be scan converted. The scan conversion module 120 is programmed to take the filtered strain rate data SR(r), which is in a particular scan sequence format, and convert the data to a rectangular coordinate system format for display purposes. The scan conversion module 120 interpolates data between neighboring sample volume locations in the scan plane 140 and generates scan-converted data samples in image coordinate format. The scan-converted data is then sent to display architecture 160 to be processed by display processing module 130 where any final spatial or temporal averaging of the data is performed and color is applied to the data. Finally, the resultant data is displayed on monitor 150 to the operator as a 2D color image where variations in color correspond to different strain rate values.

In an alternate embodiment of the invention, the complex autocorrelation data R(r) from Doppler processing module 90 is processed to estimate velocity signals in strain rate processing module 100, step 102. The tissue velocity signal v(r) for a given sample volume location is estimated from the phase angle of R(r) as $$v(r)=[c/(4\pi f_o T)]*\text{phase}[R(r)] \quad (8)$$

where v(r) is not a complex value but, instead, a real value.

The real velocity signals v(r), corresponding to sample volume locations within the scan plane 140, are then processed to estimate real unfiltered strain rate in step 104 within the strain rate processing module 100. In step 104, real unfiltered strain rate is calculated from the real velocity estimates of two sample volume locations 141 and 142 in the scan plane 140 as $$SR(r)=[v(r+dr)-v(r)]/dr \quad (9)$$

again, where dr 147 is the distance between the two sample volume locations (e.g. 141 and 142) in the scan plane 140 for a tissue segment. Alternatively, all the available samples along the scan line between the two sample volume locations 141 and 142 can be used in the strain rate estimation.

The real unfiltered strain rate signals SR(r) are then HSRR filtered in step 103 (HSRR alternative 2) by strain rate processing module 100. In step 103, the HSRR filtering sets the strain rate values that are outside of the predetermined HSRR limits to a certain value. The value may be zero or a function of the spatially surrounding samples. In step 105, the remaining strain rate samples are spatially and/or temporally averaged to yield a less noisy, smoother image using well-known averaging techniques.

Again, the filtered strain rate values SR(r) are then passed from strain rate processing module 100 to scan conversion module 120 to be scan converted. The scan converted data is then sent to display architecture 160 to be processed by display processing module 130 and displayed on monitor 150 to the operator as a 2D color image.

A further alternative is to perform the functions in either of the two alternatives previously described except move the implementation of the HSRR filtering to the end of the process as shown in FIG. 4 (HSRR alternative 3). The HSRR filtering sets the SR(r) samples to zero or a function of the spatially surrounding samples if they are outside the predetermined HSRR limits. The alternative is not expected to perform as well as the first two alternatives, since, in the preceding averaging process, the noisy (large-valued) samples may contribute heavily and may influence the surrounding samples. The alternative, however, is useful in the situation where only strain rate data is available and the other HSRR filtering embodiments are not possible to implement without extensive architecture changes.

As part of the display process, a unique color could be used to indicate areas in the image where the high strain rates were found by the HSRR filtering process. The unique color may be used to indicate the noise prone areas to the operator. Since stationary reverberations arise from stationary structures, the same areas in all the frames might be affected, even though the artifacts only are detected in some of the frames. Thus, also, if the strain rate in a region is not outside the predetermined range for a given frame, the samples in the region may still be uniquely color encoded anyway if, in other frames, there are indications of noise in the region.

The strain rate processing described above may be done in real-time as an integral feature of the ultrasound system 5. Alternatively, complex Doppler I and Q data or complex autocorrelation data may be stored and processed by the ultrasound system such that the strain rate processing is performed as a post processing feature, independent of real-time scanning. As a further alternative, complex Doppler I and Q data or complex autocorrelation data may be captured from the ultrasound system 5 and the strain rate processing and subsequent display may be performed as a post processing feature outside of the ultrasound system 5, such as on an external PC.

The processing for any embodiment of the present invention may performed by dedicated hardware elements such as circuit boards with digital signal processors or by software running on a general purpose computer or processor such as a commercial, off-the-shelf PC. The various processing modules may be combined or separated according to various embodiments of the present invention. For example, the Doppler processing module 90 and strain rate processing module 100 may be combined into a single processing element.

In summary, the advantages and features include, among others, filtering out non-physiological high strain rates due to reverberation and other sources of noise in 2D color strain rate imaging to yield improved image quality.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. Apparatus for generating strain rate signals, said apparatus comprising a high strain rate rejection filtering element being responsive to complex strain correlation signals, said complex strain correlation signals being derived from complex Doppler signals generated by an ultrasound system, and said filtering element directly generating filtered complex strain correlation signals from said complex strain correlation sinnals in order to reduce noise in said strain rate signals.

2. The apparatus of claim 1 further comprising:
    an autocorrelation processing element responsive to said complex Doppler signals to generate complex autocorrelation signals representative of Doppler shift;
    a complex strain correlation processing element responsive to said complex autocorrelation signals to generate said complex strain correlation signals;
    a complex averaging processing element responsive to said filtered complex strain correlation signals to generate averaged filtered complex strain correlation signals; and
    a strain rate conversion processing element responsive to said averaged filtered complex strain correlation signals to generate said strain rate signals.

3. The apparatus of claim 2 wherein said complex averaging processing element averages said filtered complex strain correlation signals spatially.

4. The apparatus of claim 2 wherein said complex averaging processing element averages said filtered complex strain correlation signals temporally.

5. The apparatus of claim 1 wherein said generating said strain rate signals is accomplished in real-time as an integrated function of said ultrasound system.

6. The apparatus of claim 1 wherein said generating said strain rate signals is accomplished as a post-processing function, independent of real-time operation of said ultrasound system.

7. The apparatus of claim 1 wherein said high strain rate rejection filtering element extracts phase angles from said complex strain correlation signals, compares said phase angles to a pre-determined range of phase angles and sets said complex strain correlation signals to complex zero if corresponding said phase angles of said complex strain correlation signals are outside of said pre-determined range of phase angles.

8. Apparatus for generating strain rate signals, said apparatus comprising a high strain rate rejection filtering element being responsive to unfiltered strain rate signals, said unfiltered strain rate signals being derived from complex Doppler signals generated by an ultrasound system, and said filtering element directly generating filtered strain rate signals from said strain rate signals in order to reduce noise in said strain rate signals.

9. The apparatus of claim 8 further comprising:
    an autocorrelation processing element responsive to said complex Doppler signals to generate complex autocorrelation signals representative of Doppler shift;
    a velocity estimation processing element responsive to said complex autocorrelation signals to generate velocity signals;
    a real strain rate estimating element responsive to said velocity signals to generate unfiltered strain rate signals; and
    an averaging processing element responsive to said filtered strain rate signals to generate averaged filtered strain rate signals, said averaged filtered strain rate signals being said strain rate signals.

10. The apparatus of claim 9 wherein said averaging processing element averages said filtered strain rate signals spatially.

11. The apparatus of claim 9 wherein said averaging processing element averages said filtered strain rate signals temporally.

12. The apparatus of claim 8 wherein said generating said strain rate signals is accomplished in real-time as an integrated function of said ultrasound system.

13. The apparatus of claim 8 wherein said generating said strain rate signals is accomplished as a post-processing function, independent of real-time operation of said ultrasound system.

14. The apparatus of claim 8 wherein said high strain rate rejection filtering element sets any of said unfiltered strain rate signals to zero if said any of said unfiltered strain rate signals is outside of a pre-determined range of strain rates.

15. The apparatus of claim 8 wherein said high strain rate rejection filtering element sets any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates.

16. A method for generating strain rate signals, said method comprising performing high strain rate rejection filtering on complex strain correlation signals, said complex strain correlation signals being derived from complex Doppler signals generated by an ultrasound system, and said filtering directly generating filtered complex strain correlation signals from said complex strain correlation signals in order to reduce noise in said strain rate signals.

17. The method of claim 16 further comprising:
    performing autocorrelation processing on said complex Doppler signals to generate complex autocorrelation signals representative of Doppler shift;
    performing complex strain correlation processing on said complex autocorrelation signals to generate said complex strain correlation signals;
    performing complex averaging on said filtered complex strain correlation signals to generate averaged filtered complex strain correlation signals; and
    performing strain rate conversion processing on said averaged filtered complex strain correlation signals to generate said strain rate signals.

18. The method of claim 17 wherein said performing complex averaging includes averaging said filtered complex strain correlation signals spatially.

19. The method of claim 17 wherein said performing complex averaging includes averaging said filtered complex strain correlation signals temporally.

20. The method of claim 16 wherein said generating said strain rate signals is accomplished in real-time as an integrated function of said ultrasound system.

21. The method of claim 16 wherein said generating said strain rate signals is accomplished as a post-processing function, independent of real-time operation of said ultrasound system.

22. The method of claim 16 wherein said performing high strain rate rejection filtering includes extracting phase angles from said complex strain correlation signals, comparing said phase angles to a pre-determined range of phase angles and setting said complex strain correlation signals to complex zero if corresponding said phase angles of said complex strain correlation signals are outside of said pre-determined range of phase angles.

23. A method for generating strain rate signals, said method comprising performing high strain rate rejection filtering on unfiltered strain rate signals, said unfiltered strain rate signals being derived from complex Doppler signals generated by an ultrasound system, and said filtering directly generating filtered strain rate signals from said unfiltered strain rate signals in order to reduce noise in said strain rate signals.

24. The method of claim 23 further comprising:
performing autocorrelation processing on said complex Doppler signals to generate complex autocorrelation signals representative of Doppler shift;
performing velocity estimation processing on said complex autocorrelation signals to generate velocity signals;
performing real strain rate estimating on said velocity signals to generate unfiltered strain rate signals; and
performing averaging on said filtered strain rate signals to generate averaged filtered strain rate signals, said averaged filtered strain rate signals being said strain rate signals.

25. The method of claim 24 wherein said performing averaging includes averaging said filtered strain rate signals spatially.

26. The method of claim 24 wherein said performing averaging includes averaging said filtered strain rate signals temporally.

27. The method of claim 23 wherein said generating said strain rate signals is accomplished in real-time as an integrated function of said ultrasound system.

28. The method of claim 23 wherein said generating said strain rate signals is accomplished as a post-processing function, independent of real-time operation of said ultrasound system.

29. The method of claim 23 wherein said performing high strain rate rejection filtering includes setting any of said unfiltered strain rate signals to zero if said any of said unfiltered strain rate signals is outside of a pre-determined range of strain rates.

30. The method of claim 23 wherein said performing high strain rate rejection filtering includes setting any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates.

31. A medical diagnostic ultrasound system comprising:
a transducer transmitting and receiving ultrasound signals;
a beamformer deriving data samples representative of said ultrasound signals;
a demodulation module generating complex Doppler signals in response to said data samples;
a Doppler processing module generating complex autocorrelation signals in response to said complex Doppler signals;
a strain rate processing module generating strain rate signals in response to said complex autocorrelation signals, and employing a high strain rate rejection filter to filter out signals corresponding to high strain rate values caused by noise directly from said strain rate signals; and
a display subsystem producing strain rate image frames derived from said strain rate signals.

32. The ultrasound system of claim 31 further comprising a scan conversion module to generate scan-converted strain rate data values.

33. The ultrasound system of claim 31 wherein said complex Doppler signals are demodulated data signals in the form of Doppler packets, corresponding to sample points in an image plane.

34. The ultrasound system of claim 31 wherein said complex autocorrelation signals are representative of Doppler shift and correspond to sample points in an image plane.

35. The ultrasound system of claim 31 wherein said strain rate processing module extracts phase angles from complex strain correlation signals, compares said phase angles to a pre-determined range of phase angles and sets said complex strain correlation signals to complex zero if corresponding said phase angles of said complex strain correlation signals are outside of said pre-determined range of phase angles.

36. The ultrasound system of claim 31 wherein said strain rate processing module sets unfiltered strain rate signals to zero if said unfiltered strain rate signals are outside of a pre-determined range of strain rates.

37. The ultrasound system of claim 31 wherein said strain rate processing module sets any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates.

38. Apparatus for generating strain rate signals, said apparatus comprising:
a high strain rate rejection filtering element being responsive to complex strain correlation signals, said complex strain correlation signals being derived from complex Doppler signals generated by an ultrasound system, and said filtering element generating filtered complex strain correlation signals;
an autocorrelation processing element responsive to said complex Doppler signals to generate complex autocorrelation signals representative of Doppler shift;
a complex strain correlation processing element responsive to said complex autocorrelation signals to generate said complex strain correlation signals;
a complex averaging processing element responsive to said filtered complex strain correlation signals to generate averaged filtered complex strain correlation signals; and
a strain rate conversion processing element responsive to said averaged filtered complex strain correlation signals to generate said strain rate signals.

39. The apparatus of claim 38 wherein said complex averaging processing element averages said filtered complex strain correlation signals spatially.

40. The apparatus of claim 38 wherein said complex averaging processing element averages said filtered complex strain correlation signals temporally.

41. Apparatus for generating strain rate signals, said apparatus comprising:
a high strain rate rejection filtering element being responsive to complex strain correlation signals, said complex strain correlation signals being derived from complex Doppler signals generated by an ultrasound system, and said filtering element generating filtered complex strain correlation signals, and wherein said high strain rate rejection filtering element extracts phase angles from said complex strain correlation signals, compares said phase angles to a pre-determined range of phase angles and sets said complex strain correlation signals to complex zero if corresponding said phase angles of said complex strain correlation signals are outside of said pre-determined range of phase angles.

42. Apparatus for generating strain rate signals, said apparatus comprising:
   a high strain rate rejection filtering element being responsive to unfiltered strain rate signals, said unfiltered strain rate signals being derived from complex Doppler signals generated by an ultrasound system, and said filtering element generating filtered strain rate signals;
   an autocorrelation processing element responsive to said complex Doppler signals to generate complex autocorrelation signals representative of Doppler shift;
   a velocity estimation processing element responsive to said complex autocorrelation signals to generate velocity signals;
   a real strain rate estimating element responsive to said velocity signals to generate unfiltered strain rate signals; and
   an averaging processing element responsive to said filtered strain rate signals to generate averaged filtered strain rate signals, said averaged filtered strain rate signals being said strain rate signals.

43. The apparatus of claim 42 wherein said averaging processing element averages said filtered strain rate signals spatially.

44. The apparatus of claim 42 wherein said averaging processing element averages said filtered strain rate signals temporally.

45. Apparatus for generating strain rate signals, said apparatus comprising:
   a high strain rate rejection filtering element being responsive to unfiltered strain rate signals, said unfiltered strain rate signals being derived from complex Doppler signals generated by an ultrasound system, and said filtering element generating filtered strain rate signals, and wherein said high strain rate rejection filtering element sets any of said unfiltered strain rate signals to zero if said any of said unfiltered strain rate signals is outside of a pre-determined range of strain rates.

46. Apparatus for generating strain rate signals, said apparatus comprising:
   a high strain rate rejection filtering element being responsive to unfiltered strain rate signals, said unfiltered strain rate signals being derived from complex Doppler signals generated by an ultrasound system, and said filtering element generating filtered strain rate signals, and wherein said high strain rate rejection filtering element sets any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates.

47. A method for generating strain rate signals, said method comprising:
   performing high strain rate rejection filtering on complex strain correlation signals, said complex strain correlation signals being derived from complex Doppler signals generated by an ultrasound system, and said filtering generating filtered complex strain correlation signals;
   performing autocorrelation processing on said complex Doppler signals to generate complex autocorrelation signals representative of Doppler shift;
   performing complex strain correlation processing on said complex autocorrelation signals to generate said complex strain correlation signals;
   performing complex averaging on said filtered complex strain correlation signals to generate averaged filtered complex strain correlation signals; and
   performing strain rate conversion processing on said averaged filtered complex strain correlation signals to generate said strain rate signals.

48. The method of claim 47 wherein said performing complex averaging includes averaging said filtered complex strain correlation signals spatially.

49. The method of claim 47 wherein said performing complex averaging includes averaging said filtered complex strain correlation signals temporally.

50. A method for generating strain rate signals, said method comprising performing high strain rate rejection filtering on complex strain correlation signals, said complex strain correlation signals being derived from complex Doppler signals generated by an ultrasound system, and said filtering generating filtered complex strain correlation signals, and wherein said performing high strain rate rejection filtering comprises:
   extracting phase angles from said complex strain correlation signals;
   comparing said phase angles to a pre-determined range of phase angles; and
   setting said complex strain correlation signals to complex zero if corresponding said phase angles of said complex strain correlation signals are outside of said pre-determined range of phase angles.

51. A method for generating strain rate signals, said method comprising:
   performing high strain rate rejection filtering on unfiltered strain rate signals, said unfiltered strain rate signals being derived from complex Doppler signals generated by an ultrasound system, and said filtering generating filtered strain rate signals;
   performing autocorrelation processing on said complex Doppler signals to generate complex autocorrelation signals representative of Doppler shift;
   performing velocity estimation processing on said complex autocorrelation signals to generate velocity signals;
   performing real strain rate estimating on said velocity signals to generate unfiltered strain rate signals; and
   performing averaging on said filtered strain rate signals to generate averaged filtered strain rate signals, said averaged filtered strain rate signals being said strain rate signals.

52. The method of claim 51 wherein said performing averaging includes averaging said filtered strain rate signals spatially.

53. The method of claim 51 wherein said performing averaging includes averaging said filtered strain rate signals temporally.

54. A method for generating strain rate signals, said method comprising:
   performing high strain rate rejection filtering on unfiltered strain rate signals, said unfiltered strain rate signals being derived from complex Doppler signals generated by an ultrasound system, and said filtering generating filtered strain rate signals, and wherein said performing high strain rate rejection filtering includes setting any of said unfiltered strain rate signals to zero if said any of said unfiltered strain rate signals is outside of a pre-determined range of strain rates.

55. A method for generating strain rate signals, said method comprising:

performing high strain rate rejection filtering on unfiltered strain rate signals, said unfiltered strain rate signals being derived from complex Doppler signals generated by an ultrasound system, and said filtering generating filtered strain rate signals, and wherein said performing high strain rate rejection filtering includes setting any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates.

56. A medical diagnostic ultrasound system comprising:

a transducer transmitting and receiving ultrasound signals;

a beamformer deriving data samples representative of said ultrasound signals;

a demodulation module generating complex Doppler signals in response to said data samples;

a Doppler processing module generating complex autocorrelation signals in response to said complex Doppler signals;

a strain rate processing module generating strain rate signals in response to said complex autocorrelation signals, and employing a high strain rate rejection filter to filter out signals corresponding to high strain rate values caused by noise, and wherein said strain rate processing module extracts phase angles from complex strain correlation signals and compares said phase angles to a pre-determined range of phase angles and sets said complex strain correlation signals to complex zero if corresponding said phase angles of said complex strain correlation signals are outside of said pre-determined range of phase angles; and a display subsystem producing strain rate image frames derived from said strain rate signals.

57. A medical diagnostic ultrasound system comprising:

a transducer transmitting and receiving ultrasound signals;

a beamformer deriving data samples representative of said ultrasound signals;

a demodulation module generating complex Doppler signals in response to said data samples;

a Doppler processing module generating complex autocorrelation signals in response to said complex Doppler signals;

a strain rate processing module generating strain rate signals in response to said complex autocorrelation signals, and employing a high strain rate rejection filter to filter out signals corresponding to high strain rate values caused by noise, and wherein said strain rate processing module sets unfiltered strain rate signals to zero if said unfiltered strain rate signals are outside of a pre-determined range of strain rates; and a display subsystem producing strain rate image frames derived from said strain rate signals.

58. A medical diagnostic ultrasound system comprising:

a transducer transmitting and receiving ultrasound signals;

a beamformer deriving data samples representative of said ultrasound signals;

a demodulation module generating complex Doppler signals in response to said data samples;

a Doppler processing module generating complex autocorrelation signals in response to said complex Doppler signals;

a strain rate processing module generating strain rate signals in response to said complex autocorrelation signals, and employing a high strain rate rejection filter to filter out signals corresponding to high strain rate values caused by noise, and wherein said strain rate processing module sets any of said unfiltered strain rate signals to a value that is a function of a subset of unfiltered strain rate signals spatially surrounding said any of said unfiltered strain rate signals if said any of said unfiltered strain rate signals is outside of a pre-determined range of strain rates; and a display subsystem producing strain rate image frames derived from said strain rate signals.

* * * * *